(12) United States Patent (10) Patent No.: US 6,474,550 B1
Caridas (45) Date of Patent: Nov. 5, 2002

(54) CREDIT CARD READER ENCLOSURE WITH DEBRIS OPENING

(75) Inventor: Arleta Caridas, Yorba Linda, CA (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

(21) Appl. No.: 09/272,726

(22) Filed: Mar. 18, 1999

(51) Int. Cl.⁷ .................................................. G06K 5/00
(52) U.S. Cl. ...................................... 235/380; 235/379
(58) Field of Search ................................. 235/380, 449, 235/379

(56) References Cited

U.S. PATENT DOCUMENTS

| | | | |
|---|---|---|---|
| 5,589,681 A | * 12/1996 | Merlin et al. ................. | 235/482 |
| 5,905,252 A | * 5/1999 | Magana ........................ | 235/475 |
| 5,949,047 A | * 9/1999 | Abe et al. ..................... | 235/435 |
| 6,019,623 A | * 2/2000 | Ito et al. ....................... | 439/206 |

\* cited by examiner

*Primary Examiner*—Mark Tremblay
(74) *Attorney, Agent, or Firm*—Salzman & Levy

(57) ABSTRACT

The present invention features an enclosure for a credit card reader. The enclosure has a top cover for protecting and enclosing the card reader and a base disposed below the card reader, enclosing the bottom surface thereof. The top cover need not be used. The base is configured to allow debris to be conveyed below the card reader. An aperture is formed between the top cover and the base. The aperture is aligned with the card slot opening of the card reader so that a user can insert a credit card into, and withdraw the credit card from, the card reader. The base of the enclosure is disposed at an angle relative to the horizontal for facilitating conveyance of debris to the rear of the enclosure. The base also has an outlet at its rear for allowing debris to fall out of the enclosure, preventing blocking of the card reader by debris. The enclosure can be used with an improved credit card reader for processing bent, bowed, or warped credit or smart cards. A bent, bowed, or warped credit or smart card that would normally miss the supporting card ramp of the reader and drop through the debris opening, is redirected into the processing path by a deflection guide.

7 Claims, 5 Drawing Sheets

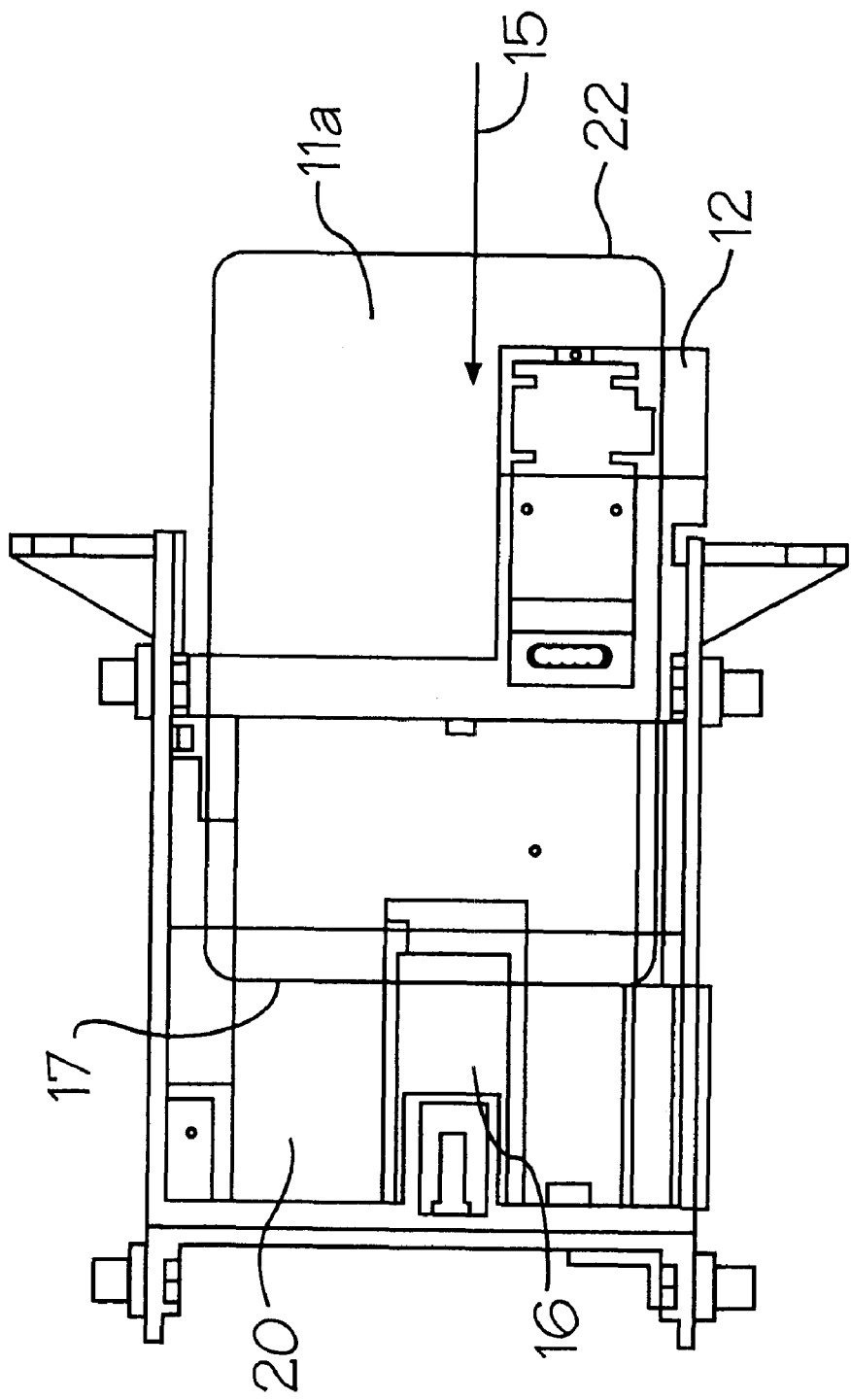

CREDIT CARD READER ENCLOSURE WITH DEBRIS OPENING

RELATED PATENT APPLICATION

The present patent application is related to copending U.S. patent application, Ser. No. 09/272,661, filed concurrently herewith for APPARATUS FOR PROCESSING WARPED, BOWED AND BENT CREDIT CARDS.

FIELD OF THE INVENTION

The present invention relates to credit card and smart card readers and, more particularly, to enclosures for credit and smart card readers having provision for receiving debris and other foreign objects.

BACKGROUND OF THE INVENTION

Credit and smart cards are becoming a ubiquitous phenomena in the civilized world. Cards are used to purchase goods and services, to rent vehicles and equipment and pay for the fuel to operate them, to withdraw cash, to travel by land, sea and air, to access buildings, and even to make telephone calls. As omnipresent as the cards, of course, are the devices used to "read" them. These card readers are a common sight at retail establishments such as supermarkets, hotels, restaurants and department stores, airline terminals, gas stations, and telephone kiosks.

Where once only trained personnel were permitted access to the card readers, the nature of business has changed to the extent that members of the public are now permitted and even encouraged to use them directly to purchase their goods or services. Thus, card readers increasingly appear at public or semi-public locations around the world. Moreover, many of them are rarely under the supervision or surveillance of trained personnel.

As a result, it is not unusual for debris and foreign objects (coins or dollar bills, for example) to be placed in the card slot of the readers either inadvertently by inexperienced users, by juveniles, or by vandals. When such events occur, the foreign matter has a tendency to block or jam the entrance to the reader, preventing use of the reader and requiring maintenance personnel to remedy the situation before the reader can be placed in operation.

Some credit and smart card readers have a debris opening that allows items other than full credit cards to drop or fall out of the card reader. This opening prevents jamming that would require maintenance and repair.

In conjunction with a need to handle debris and foreign objects placed in a card reader, there has been found a need to handle bent, bowed, or warped cards, as described in copending U.S. patent application, Ser. No. 09/272,661. Such warped cards do not follow the processing path within the reader. The leading edge of a warped card passes through the insert slot without being captured. Therefore, when the trailing edge passes the insert station, no support is provided for the card. Since the leading edge of a warped card normally passes through an insertion slot to contact a card ramp, bowed or warped credit cards miss this card ramp and fall through the debris opening, thus becoming confiscated.

It would be advantageous to provide an enclosure for an improved credit card reader.

It would also be advantageous to provide such an enclosure with a debris pathway for directing foreign objects.

It would also be advantageous to provide such an enclosure with a debris opening to allow foreign objects to fall out of the reader and towards the bottom of the enclosure, eventually falling out of the enclosure itself.

It would further be advantageous to provide such an enclosure and debris opening that would facilitate removal of such foreign objects but would discourage or prevent insertion of such foreign objects.

It would be yet further advantageous to provide an enclosure with debris opening in conjunction with a credit or smart card reader that can process bent, bowed, or warped credit cards.

SUMMARY OF THE INVENTION

In accordance with the present invention, there is provided an enclosure for a credit card reader. The enclosure has a top cover for protecting and enclosing the card reader and a base disposed below the card reader, enclosing the bottom surface thereof. In an alternate embodiment, the top cover need not be used. The base is configured to allow debris to be conveyed below the card reader. An aperture is formed between the top cover and the base. The aperture is aligned with the card slot opening of the card reader so that a user can insert a credit card into, and withdraw the credit card from, the card reader. The base of the enclosure is disposed at an angle relative to the horizontal for facilitating conveyance of debris to the rear of the enclosure. The base also has an outlet at its rear for allowing debris to fall out of the enclosure, preventing blocking of the card reader by debris.

The credit card reader itself can be adapted to process bent, bowed, or warped credit or smart cards. A normal, undamaged card is inserted into a slot provided in the insertion slot of the card reader. The normal card travels along a processing path contacting a supporting card ramp. Once fully inserted, the normal card is processed in the usual manner. The debris opening provided below the processing path adjacent the insertion slot allows any item other than a full card to drop out of the processing path.

In the case of a warped, bowed, or bent card, the debris opening is a trap for a deformed card. The card will be confiscated, rather than processed. The leading edge of a warped card passes through the insert slot without contacting the card ramp. Therefore, when the trailing edge passes the insert station, no stop is provided for the card. The card then drops through the debris opening without being processed. This is not desirable, owing to the fact that a great number of cards become deformed when carried in a back-pocket wallet. This results in certain valid cards being unintentionally confiscated by the reader.

In order to prevent this, the apparatus of the present invention provides a deflection guide disposed along the processing path adjacent the card ramp. The deflection guide has a curved or angled surface. The leading edge of a warped or bowed card impinges upon the deflection guide, after being inserted into the slot. The curved or angled surface of the guide forces the leading edge of the card into the processing path, where it comes to stop in the processing path.

It is an object of the invention to provide an enclosure for an improved credit card reader.

It is an object of the invention to provide such an enclosure with a debris pathway for directing foreign objects.

It is an object of the invention to provide such an enclosure with a debris pathway to allow foreign objects to fall out of the reader and towards the bottom of the enclosure, eventually falling out of the enclosure itself.

It is yet another object of the invention to provide an enclosure with debris opening in conjunction with a credit or smart card reader that can process bent, bowed, or warped credit cards.

BRIEF DESCRIPTION OF THE DRAWINGS

A complete understanding of the present invention may be obtained by reference to the accompanying drawings, when considered in conjunction with the subsequent detailed description, in which:

FIG. 7 shows a bottom view of the card reader apparatus illustrated in FIGS. 2 and 4 through 6.

For purposes of clarity and brevity, like elements and components will bear the same numbering and designation throughout the figures.

DESCRIPTION OF THE PREFERRED EMBODIMENT

Generally speaking, the invention features an enclosure for a credit card reader. The enclosure has a top cover for protecting and enclosing the card reader and a base disposed below the card reader, enclosing the bottom surface thereof. The base is configured to allow debris to be conveyed below the card reader. An aperture is formed between the top cover and the base. The aperture is aligned with the card slot opening of the card reader so that a user can insert a credit card into, and withdraw the credit card from, the card reader. The base of the enclosure is disposed at an angle relative to the horizontal for facilitating conveyance of debris to the rear of the enclosure. The base also has an outlet at its rear for allowing debris to fall out of the enclosure, preventing blocking of the card reader by debris.

Figure 1:
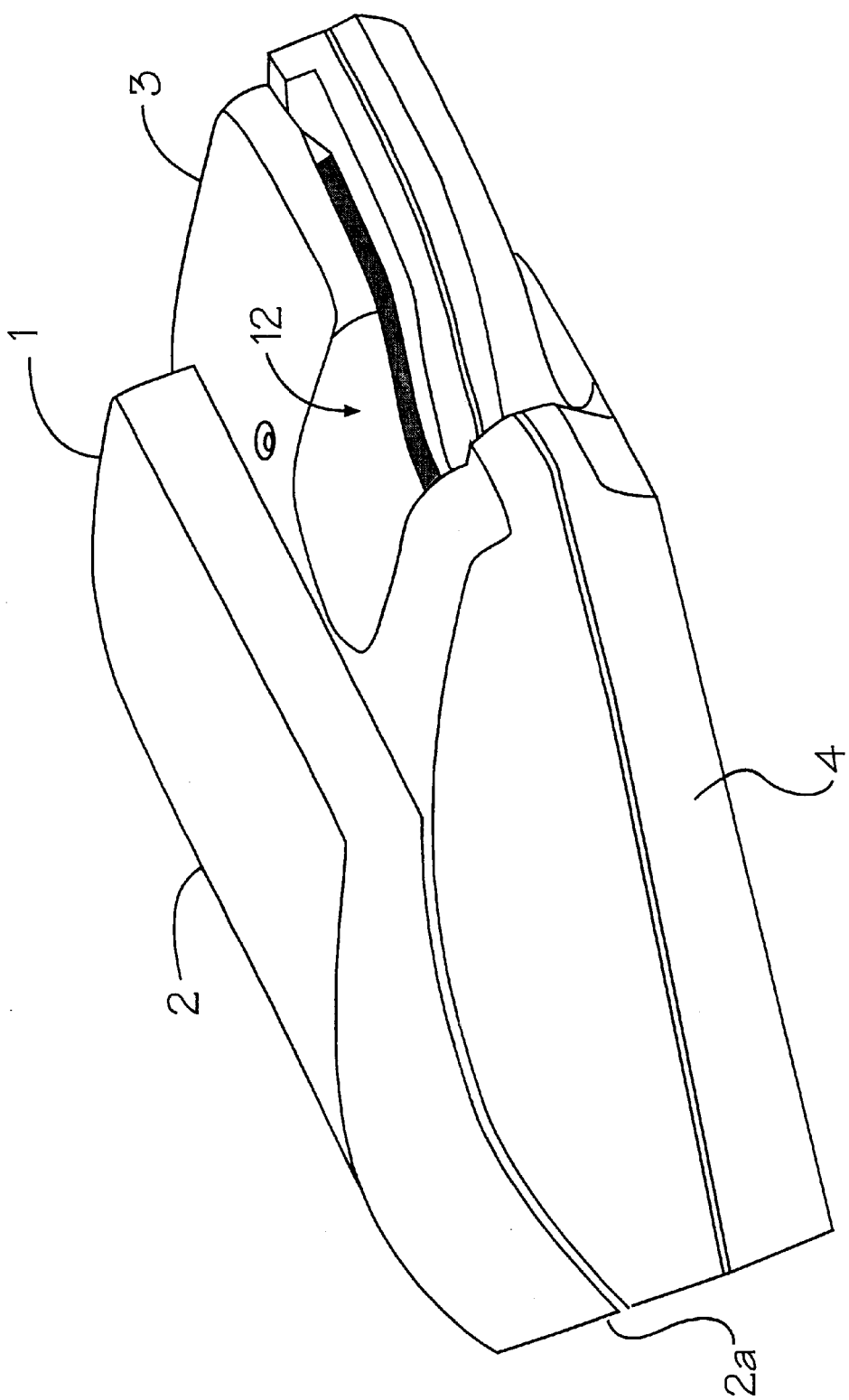
FIG. 1 is a perspective view of the enclosure in accordance with the present invention.

Now referring to FIG. 1, there is shown a perspective view of the enclosure 1 of the present invention. It should be noted that enclosure 1 is depicted in a substantially horizontal orientation shown in FIG. 1. This is not necessarily the only operational orientation of the apparatus but, for purposes of this description, is a convenient depiction to illustrate the flow of debris (not shown) within enclosure 1 during operation.

A top cover 2 of suitably rigid material, such as plastic or metal, protects and encloses a credit card reader, not shown in this FIGURE. Top cover 2 can be suitably mounted by one or more hinges, not shown, at its left, rearmost end 2a. It should be understood, however, that, depending upon the application and environment of the credit card reader, top cover 2 need not be required. Therefore, in an alternate embodiment, top cover 2 of enclosure 1 is not present.

Figure 2:
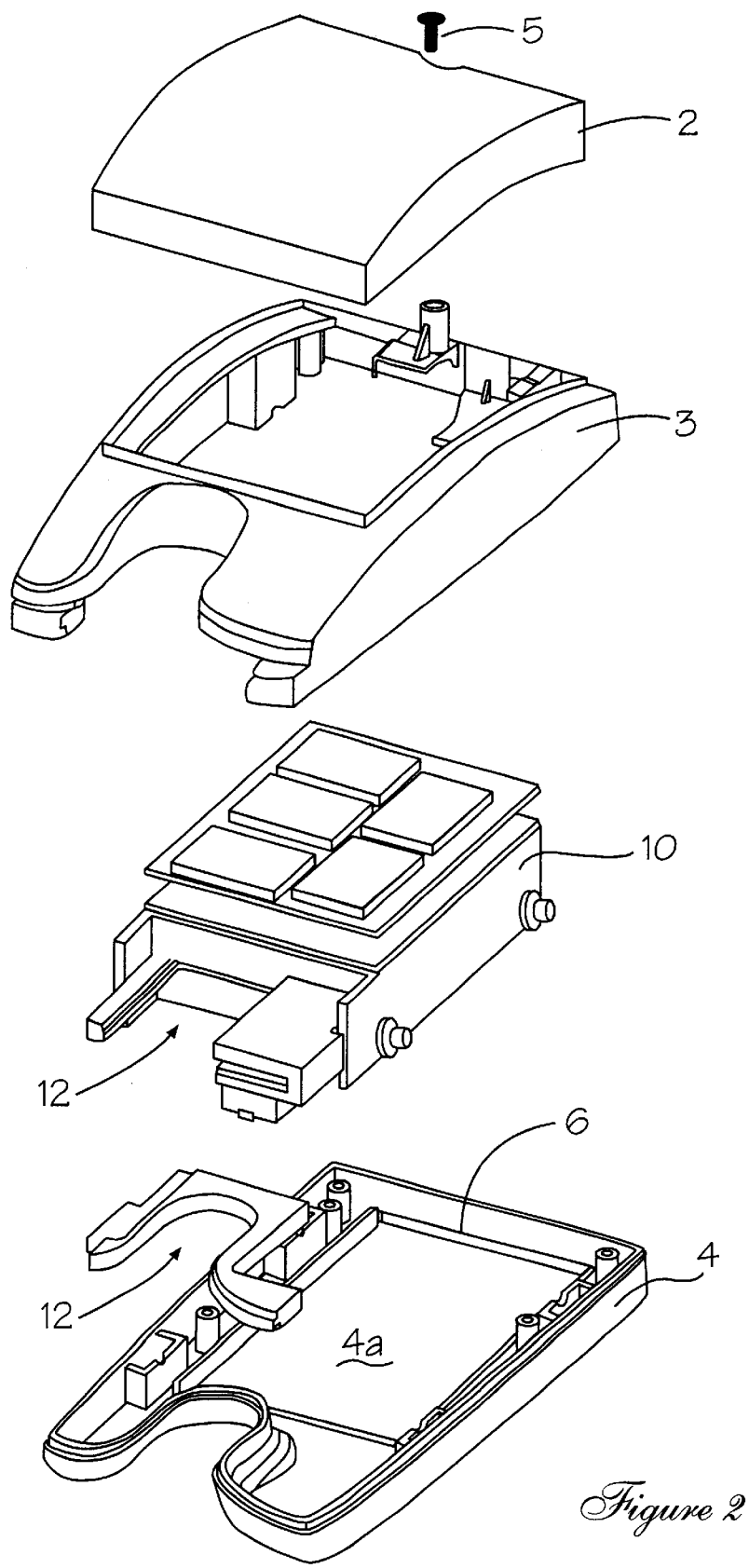
FIG. 2 is an exploded view of the enclosure and credit card reader disposed therein.

An upper shell 3 encases the upper surface of the card reader, as shown in greater detail in FIG. 2. A base 4 is disposed under the lower surface of the card reader, and is also shown in greater detail in FIG. 2. A card insertion opening 12 is provided for a credit card user to insert a credit card (not shown) into, or withdraw the card from, the card reader. As can be seen in this FIGURE, a suitable aperture is provided in enclosure 1 and aligned with insertion opening 12 for facilitating such credit card manipulation and operation.

Referring now also to FIG. 2, there is shown an exploded view of enclosure 1 and credit card reader 10 disposed therein. A screw 5 or similar fastening device attaches top cover 2 to upper shell 3 which, in turn, forms a protective covering, encasing the upper surface of credit card reader 10. Card reader 10, in turn, is mounted to base 4 by suitable means well known in the art. Base 4 has a lower surface 4a that is adapted to receive debris and foreign objects (e.g., coins and paper bills, not shown) inserted in insertion opening 12. Lower surface 4a is angled downwardly at its distal end 6, so that such debris and foreign material can fall rearwardly, out of enclosure 1 itself, and away from card reader 10.

Figure 4:
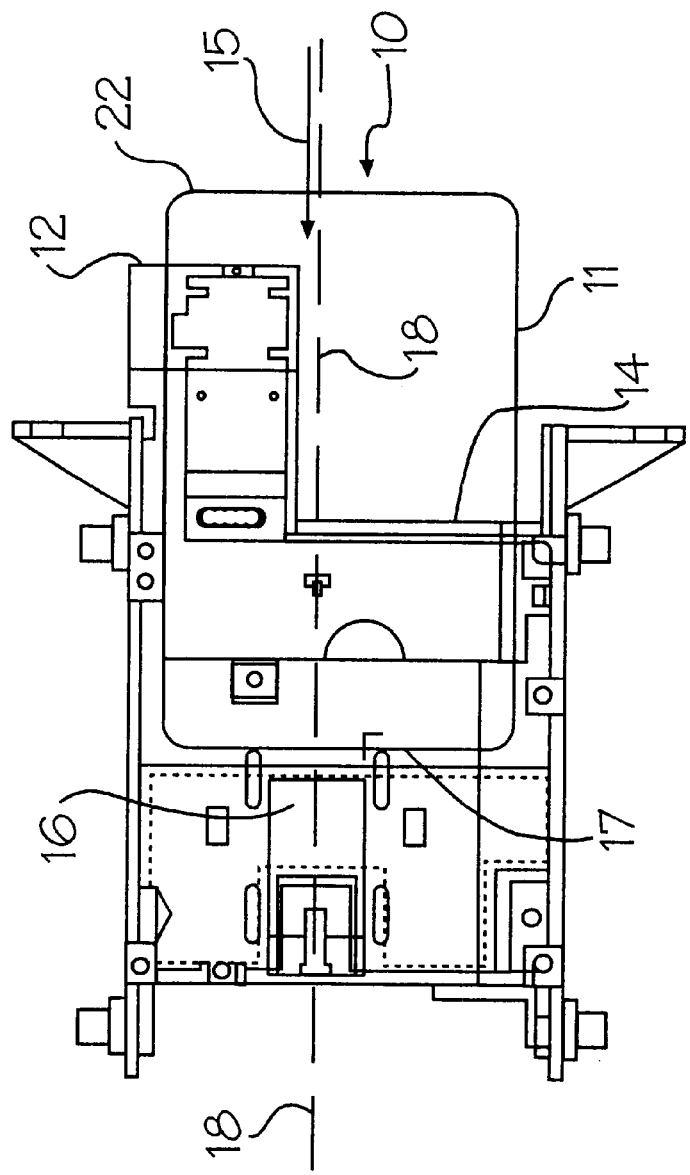
FIG. 4 depicts a top view of the insertion slot and card ramp for a card reader apparatus, and an in situ view of a normal credit card being introduced into the card reader.
Figure 5:
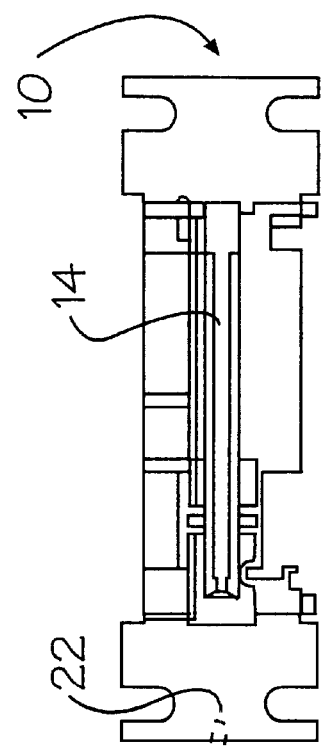
FIG. 5 shows a front view of the insertion slot depicted in FIG. 4.

As aforementioned, enclosure 1 is intended to be used with an improved card reader 10 that is capable of handling bent, bowed, or warped credit cards. Thus, referring now also to FIG. 4, a top view of insertion opening 12 of the improved card reader 10, is illustrated. A credit card 11 is shown being inserted (arrow 15) into insertion slot 14 of insertion opening 12, as best observed with reference to FIG. 5. The leading edge 17 of a straight, unbowed card 11 is able to reach a card ramp 16, thus allowing card 11 to be supported, as it travels along the processing path, shown by phantom line 18.

Referring to FIG. 7, a bowed card 11a (best shown in FIG. 6 in phantom lines) is inserted (arrow 15) into card reader 10, but does not contact card ramp 16. The leading edge 17 of card 11a, not being able to contact card ramp 16, is caused to drop through a debris opening 20, when the trailing edge 22 passes through insertion slot 14, owing to the fact that bowed card 11a has no support at either edge 17 or 22, respectively.

Figure 3:
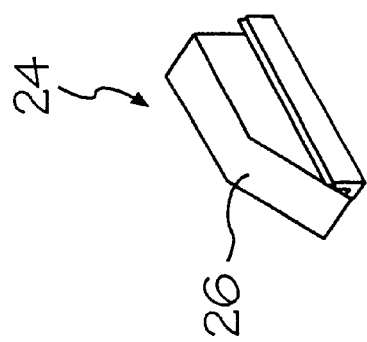
FIG. 3 illustrates a perspective view of the card guide of this invention.
Figure 6:
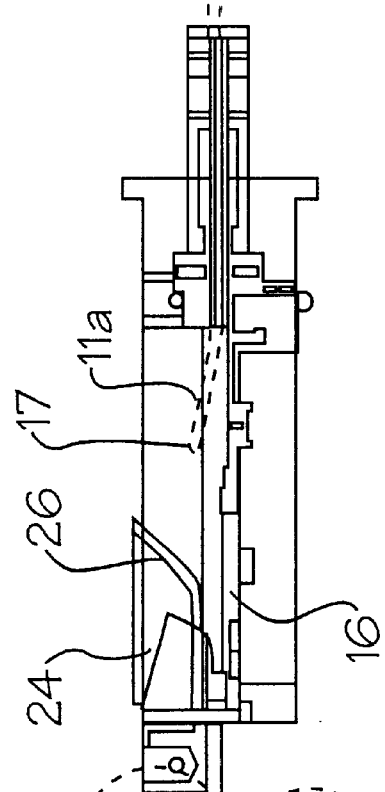
FIG. 6 illustrates a side view of the card guide disposed within the card reader with a bent card shown in phantom view.

Referring to FIGS. 3 and 6, a deflection guide 24 is shown having a curved or angled surface 26. Deflection guide 24 is disposed above and below card ramp 16. Generally, only one deflection guide 24 is needed; however, multiple deflection guides 24 can be incorporated into a reader 10. The leading edge 17 of bowed card 11a is caused to contact the curved or angled surface 26 of deflector guide 24, as it is inserted into card reader 10. The curved or angled surface 26 is impinged by the leading edge 17 of bowed card 11a, causing the card 11a to deflect into the processing path 18. Thus, card reader 10 now has the capability of processing bent, bowed, or warped cards 11a.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for processing bent, bowed, or warped credit cards comprising:

means defining a card processing path, said path including card reading means;

a top cover for protecting and enclosing said card reading means, said card reading means having upper and lower surfaces, and means defining a card slot opening;

a base disposed below said card reading means and enclosing the lower surface thereof, said base being configured to allow debris to be conveyed below said bottom surface of said card reading means;

an aperture formed between said top cover and said base, said aperture being aligned with said card slot opening of said card reading means so that a user can insert a card into, and withdraw said card from, said card reading means; and a pair of juxtaposed deflection guides respectively disposed adjacent each other above and below said card processing path for engaging bent, bowed, or warped cards, and deflecting them into said processing path.

2. The apparatus for processing bent, bowed, or warped credit cards in accordance with claim 1, wherein said base is disposed at an angle relative to the horizontal for facilitating conveyance of debris to the rear of said enclosure.

3. The apparatus for processing bent, bowed, or warped credit cards in accordance with claim 2, wherein said base further comprises an outlet at a rear portion thereof for allowing debris to fall from said card reading means, thus preventing blocking of said card reading means by debris.

4. An apparatus for processing bent, bowed, or warped credit cards, comprising:

i) means defining a processing path upon which a credit or smart card is caused to travel;

ii) means defining an insertion slot disposed along said processing path for inserting a card to be read and processed;

iii) a card guide disposed along said processing path for holding a card for reading and processing; and iv) a pair of deflection guides disposed along said processing path juxtaposed respectively above and below said insertion slot for receiving a bent, bowed, or warped credit, or smart card, one of said deflection guides forcing a leading edge of said card into said processing path, whereby said card is held for reading and processing.

5. An apparatus for processing bent, bowed, or warped credit, or smart cards comprising:

a) a card reader having an upper and a lower surface and means defining a card slot opening and a card processing path;

b) a base disposed below said card reader and enclosing the bottom surface thereof, said base being configured to allow debris to be conveyed below said bottom surface of said card reader;

c) an aperture formed by said base, said aperture being aligned with said card slot opening of said card reader so that a user can insert a credit, or smart card into, and withdraw said credit, or smart card from, said card reader; and d) a pair of deflection guides respectively disposed above and below a card processing path for engaging bent, bowed, or warped cards, and deflecting them into said processing path.

6. The apparatus for processing bent, bowed, or warped credit cards in accordance with claim 5, wherein said base is disposed at an angle relative to the horizontal for facilitating conveyance of debris to the rear of said enclosure.

7. The apparatus for processing bent, bowed, or warped credit cards in accordance with claim 6, wherein said base further comprises an outlet at a rear portion thereof for allowing debris to fall from said card reading means, thus preventing blocking of said card reading means by debris.

* * * * *